United States Patent
Hughes et al.

(10) Patent No.: US 10,104,015 B2
(45) Date of Patent: Oct. 16, 2018

(54) GATEWAY/STANDALONE FIBRE CHANNEL SWITCH SYSTEM

(71) Applicant: Dell Products L.P., Round Rock, TX (US)

(72) Inventors: Kevin Allen Hughes, Cedar Park, TX (US); Jason Garth Pearce, Round Rock, TX (US)

(73) Assignee: Dell Products L.P., Round, TX (US)

( * ) Notice: Subject to any disclaimer, the term of this patent is extended or adjusted under 35 U.S.C. 154(b) by 146 days.

(21) Appl. No.: 15/348,457

(22) Filed: Nov. 10, 2016

(65) Prior Publication Data
US 2018/0131637 A1    May 10, 2018

(51) Int. Cl.
*H04L 12/66* (2006.01)
*H04L 12/931* (2013.01)

(52) U.S. Cl.
CPC ............ *H04L 49/357* (2013.01); *H04L 12/66* (2013.01)

(58) Field of Classification Search
CPC ............................ H04L 49/357; H04L 12/66
See application file for complete search history.

(56) References Cited

U.S. PATENT DOCUMENTS

| | | | | |
|---|---|---|---|---|
| 7,203,730 | B1* | 4/2007 | Meyer | G06F 3/0605 370/400 |
| 2001/0047463 | A1* | 11/2001 | Kamano | G06F 3/0601 711/163 |
| 2006/0034302 | A1* | 2/2006 | Peterson | H04L 45/04 370/401 |
| 2007/0079092 | A1* | 4/2007 | Hara | G06F 21/80 711/163 |
| 2010/0313256 | A1* | 12/2010 | Sekiguchi | H04L 63/102 726/7 |

* cited by examiner

*Primary Examiner* — Hashim Bhatti
(74) *Attorney, Agent, or Firm* — Haynes and Boone, LLP

(57) ABSTRACT

A FC system includes an FC switch that receives local device FLOGIs that identify local devices through a first subset of ports, and provides a local address in a mapping database for each of the identified local devices. The FC switch then transmits an FC switch FLOGI using a second subset of ports through which no local device fabric login was received, and determines whether a FLOGI ACC has been received back. If a FLOGI ACC is received, the FC switch provides a fabric address in the mapping database for each of the identified local devices, and uses the local addresses/fabric addresses for each respective identified local device to provide communications between the identified local devices and an FC fabric. If no fabric login acceptance is received, the FC networking device uses the local addresses for respective identified local devices to provide communications between the identified local devices.

20 Claims, 9 Drawing Sheets

GATEWAY/STANDALONE FIBRE CHANNEL SWITCH SYSTEM

BACKGROUND

The present disclosure relates generally to information handling systems, and more particularly to Fibre Channel networking information handling system that is configured to operate in a hybrid gateway/standalone mode.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured to utilize Fibre Channel (FC) networking technology that provides high speed connections between devices using FC networking devices such as FC switches. For example, enterprise storage systems typically utilize FC networking technology in Storage Area Networks (SANs). Conventional FC switches may be configured in a variety of modes depending on the details of the SAN, and the configuration of those modes to allow the SAN to operate properly can raise a number of issues. For example, some SANs involve an FC switch that provides communications between local server devices and local storage devices while not being connected to or providing communications with an FC fabric that includes other FC switches, and those SANs require the configuration of that FC switch in a "standalone" or "direct attach" mode to configure that FC switch to route communications between the local server device and local storage devices. In another example, some SANs involve an FC switch that provides communications between local server devices and local storage devices and an FC fabric that includes other FC switches coupled to remote server devices and remote storage devices, and those SANs require the configuration of that FC switch in a "gateway" mode to configure that FC switch to route communications between the local server device, local storage devices, remote server devices, and remote storage devices. The configuration of FC switches for the different SANs discussed above is a manual process that must be performed by a network administrator or other user when a SAN is initially set up and when the state of connectivity of the FC switch to an FC fabric changes (e.g., when the FC switch is connected to or disconnected from the FC fabric). This manual configuration additionally requires a reboot of the FC switch, which stops traffic to its local server devices and local storage devices during the reboot process.

Accordingly, it would be desirable to provide an improved FC networking device.

SUMMARY

According to one embodiment, an information handling system includes a plurality of ports; a processing system that is coupled to the storage device and the plurality of ports; and a memory system that is coupled to the processing system and that includes instructions that, when executed by the processing system cause the processing system to provide a gateway/standalone mode engine that is configured to: receive a first Fibre Channel (FC) fabric login through each of a first subset of the plurality of ports, wherein each first FC fabric login identifies one of a plurality of local devices; provide a local address in a mapping database for each of the plurality of local devices identified by the first FC fabric logins; transmit a second FC fabric login through each of a second subset of the plurality of ports through which no first FC fabric login was received; determine whether a FC fabric login acceptance has been received through any of the second subset of the plurality of ports through which the second FC fabric login was transmitted; provide, in response to determining that the FC fabric login acceptance was received, a FC fabric address in the mapping database for each of the plurality of local devices identified by the first FC fabric logins, and use the local address and the FC fabric address for each of the plurality of local devices identified by the first FC fabric logins to provide communications between the plurality of local devices identified by first FC fabric logins and an FC fabric; and use, in response to determining that no FC fabric login acceptance was received, the local address for each of the plurality of local devices identified by the first FC fabric logins to provide communications between the plurality of local devices identified by the first FC fabric logins.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
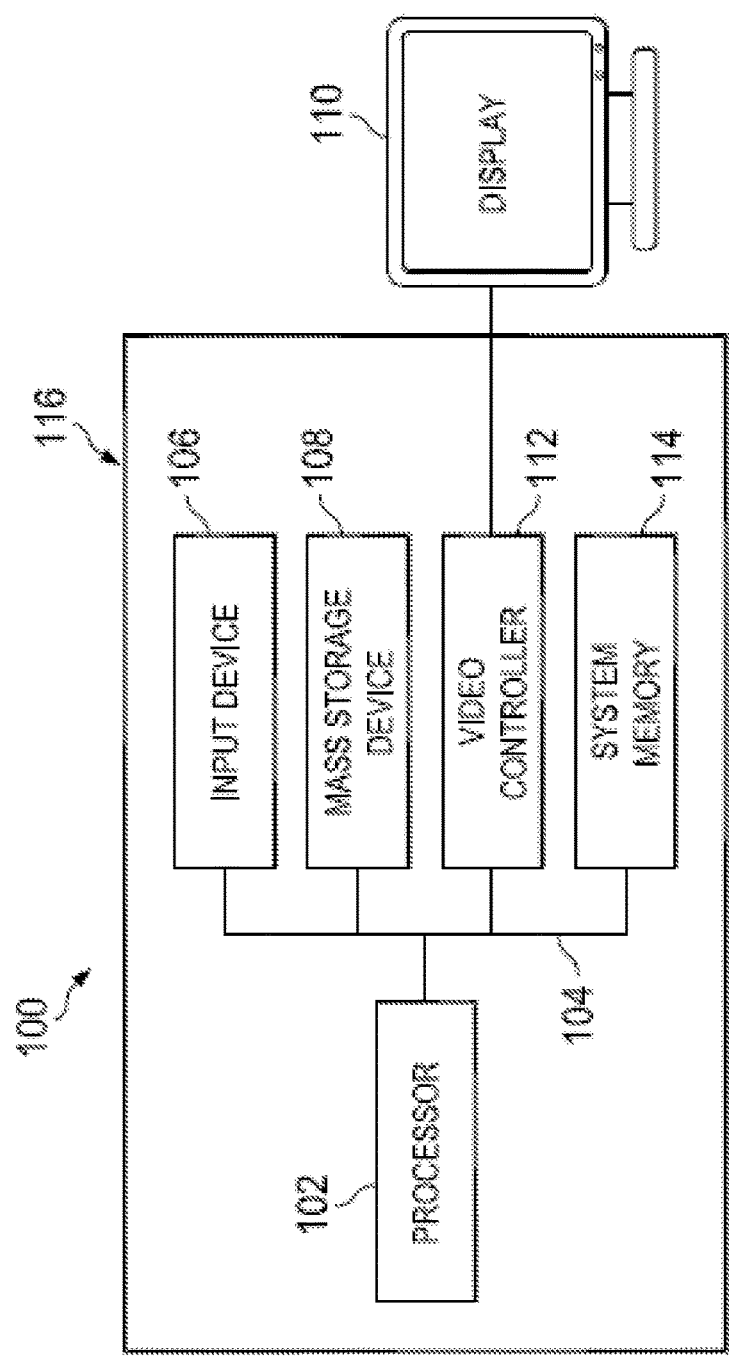
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
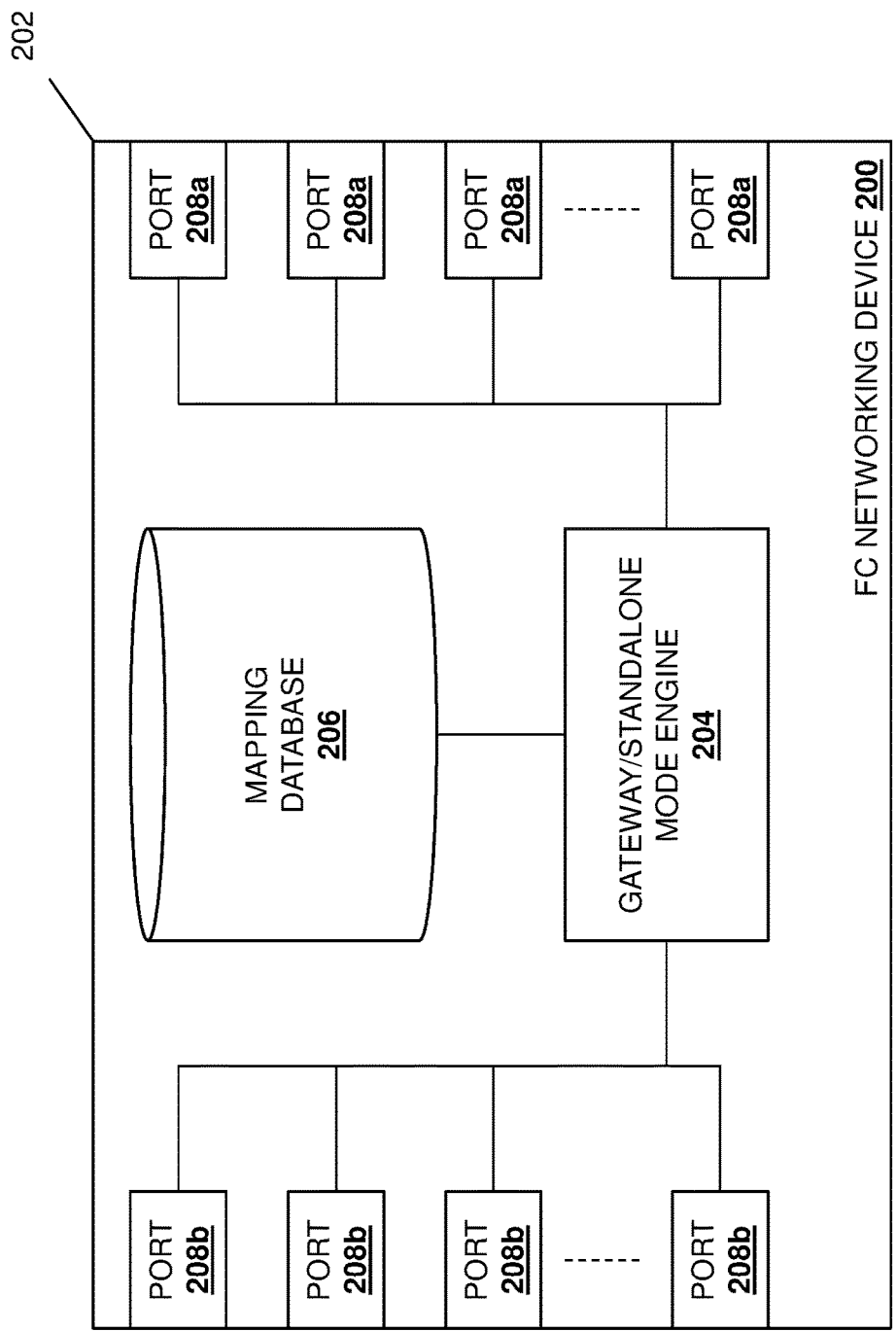
FIG. 2 is a schematic view illustrating an embodiment of an FC networking device.

Referring now to FIG. 2, an embodiment of a Fibre Channel (FC) networking device 200 is illustrated. One of skill in the art in possession of the present disclosure will recognize that the FC networking device 200 is described below as an FC switch device that is compatible with the FC protocol and that is configured to provide, or to operate as part of, an FC fabric used in, for example, a Storage Area Network (SAN) to allow many-to-many communications, device name lookup, security, and redundancy, while implementing zoning and other FC functionality known in the art. However, the FC networking device may include, or be included in, a variety of other FC networking systems and/or subsystems while remaining within the scope of the present disclosure. In an embodiment, the FC networking device 200 may be the IHS 100 discussed above with reference to FIG. 1, and/or may include some or all of the components of the IHS 100. In the illustrated embodiment, the FC network-ing device 200 includes a chassis 200 that houses the components of the FC networking device 200, only some of which are illustrated in FIG. 2. For example, the chassis 202 may house a processing system (not illustrated, but which may include the processor 102 discussed above with reference to FIG. 1) and a memory system (not illustrated, but which may include the memory discussed above with reference to FIG. 1) that includes instructions that, when executed by the processing system, cause the processing system to provide a gateway/standalone mode engine 204 that is configured to perform the operations of the gateway/standalone mode engines and FC networking devices discussed below.

The chassis 202 may also house a storage device (not illustrated, but which may include the storage device 108 discussed above with reference to FIG. 1) that is coupled to the gateway/standalone mode engine 204 (e.g., via a coupling between the processing system and the storage device) and that includes a mapping database 206 that is configured to store the mapping information discussed below. The chassis 202 may also include a plurality of ports that, in the example below, are described as a first subset 208a of the plurality of ports on the FC networking device 200 and a second subset 208b of the plurality of ports on the FC networking device 200. However, one of skill in the art in possession of the present disclosure will recognize that the distinctions between the subsets of the plurality of ports on the FC networking device 200 that are coupled to different subsystems (e.g., the local devices and the FC fabric discussed below) in the examples below are simply made to clearly describe the functionality of the FC networking device 200, and any of the plurality of ports may be coupled to any of a variety of subsystems known in the art while remaining within the scope of the present disclosure. While a specific FC networking device 200 has been described, one of skill in the art in possession of the present disclosure will recognize that different FC networking devices may include different and/or additional components known in the art that allow the FC networking device to perform a variety of conventional FC networking device functionality as well.

Figure 3:
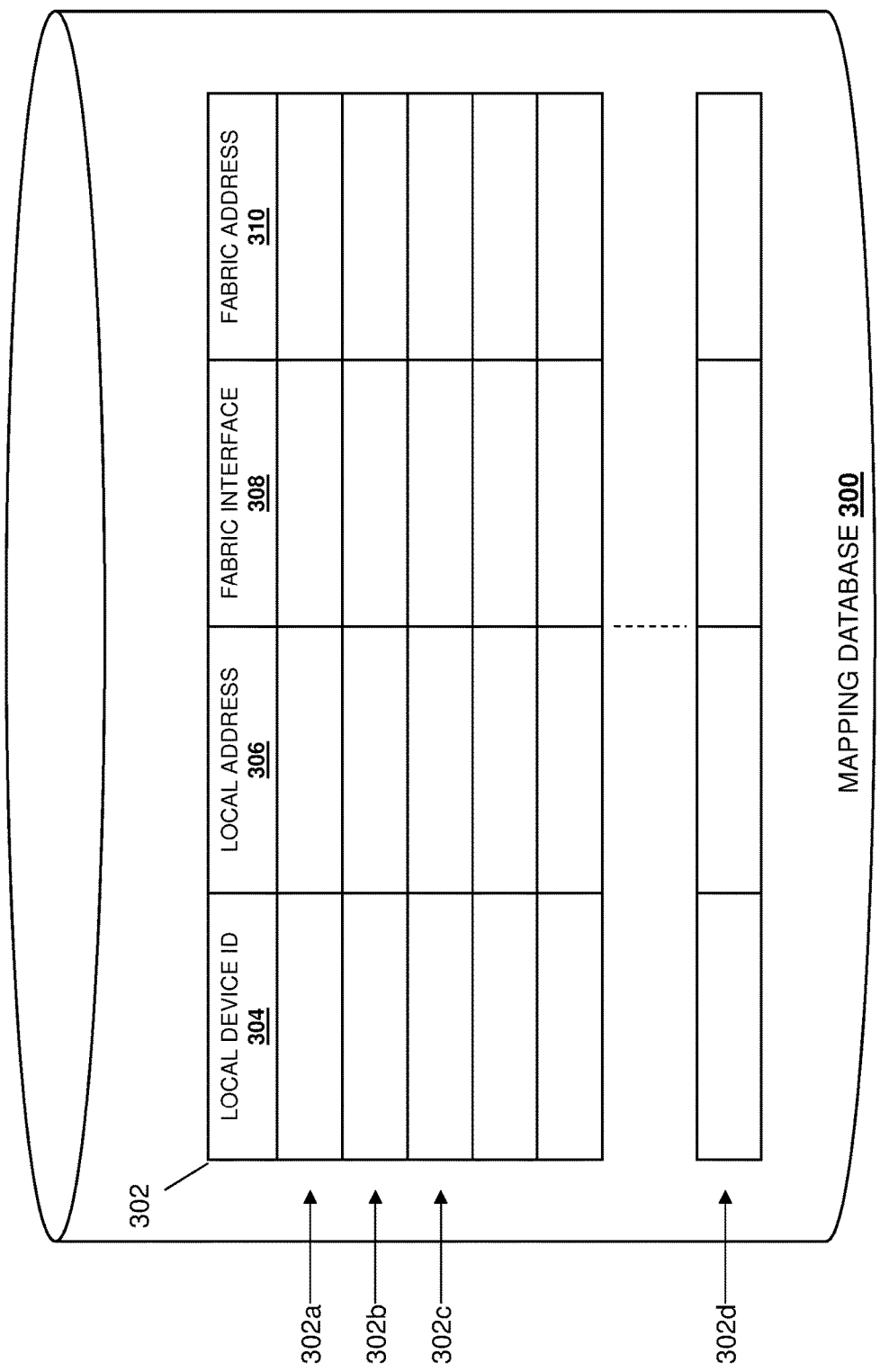
FIG. 3 is a schematic view illustrating an embodiment of a mapping database in the FC networking device of FIG. 2.

Referring now to FIG. 3, an embodiment of a mapping database 300 is illustrated. In an embodiment, the mapping database 300 may be the mapping database 206 discussed above with reference to FIG. 2. In a specific example, the mapping database 300 may include a name server database that includes information about the local devices attached to its FC networking device, and may be considered a "proxy" Network Address Translation (NAT)-like mapping database that is configured to provide the functionality of the FC networking devices discussed below. In the illustrated example, the mapping database 206 includes a mapping table 302 having mapping table entries 302a, 302b, 302c, and up to 302d. For each mapping table entry 302a-d, the mapping table includes a local device identifier column 304, a local address column 306, a fabric interface column 308, and a fabric address column 310. However, one of skill in the art in possession of the present disclosure will recognize that the mapping database 300 and/or the mapping table 302 may include and/or store other information to enable the functionality discussed below while remaining within the scope of the present disclosure.

Figure 4:
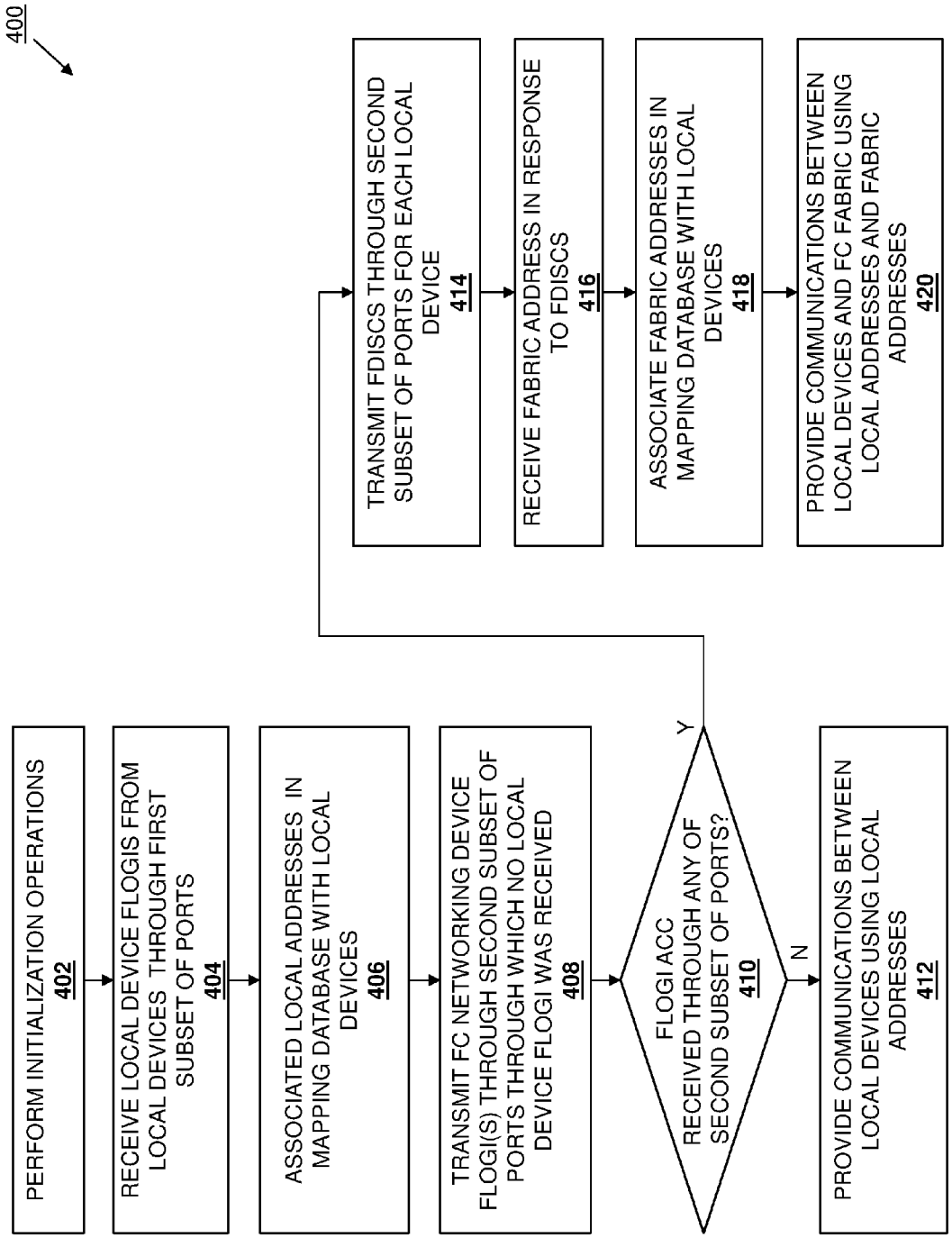
FIG. 4 is a flow chart illustrating an embodiment of a method for providing a gateway/standalone mode in an FC networking device.

Referring now to FIG. 4, an embodiment of a method 400 for providing a gateway/standalone mode in an FC networking device is illustrated. As discussed below, in some embodiments the method 400 may be implemented in the FC networking device 200 of FIG. 2 using the mapping database 300 of FIG. 3 to provide a "hybrid" gateway/ standalone mode in the FC networking device 200 that alleviates the need for an administrator or other user to manually configure the FC networking device 200 to operate in either a standalone mode or a gateway mode. As discussed above, some SANs include an FC networking device that provides communications between local devices (e.g., the local server devices and local storage devices discussed below) while not being connected to or providing communications with an FC fabric that includes other FC switches connected to remote server devices and remote storage devices, and those SANs require the administrator or user to manually configure the FC networking device in a "standalone" or "direct attach" mode that allows that FC networking device to provide communications between the local server devices and storage devices. One of skill in the art in possession of the present disclosure will recognize that the terms "local" and "remote" in this context may refer to embodiments that describe a point of view of the FC networking device of the present disclosure, with local devices being directly connected to that FC networking device or otherwise not connected to that FC networking device though an FC fabric, and remote devices being coupled to that FC networking device through an FC fabric (e.g., a different FC networking device).

As also discussed above, some SANs include an FC networking device that provides communications between local devices (e.g., the local server devices and local storage devices discussed below) and an FC fabric that includes other FC networking device coupled to remote server devices and storage devices, and those SANs require the administrator or user to manually configure the FC networking device in a "gateway" mode to act as a gateway (e.g., a node port (N_Port) Identification (ID) virtualization (NPIV) gateway) to an FC fabric (e.g., an upstream SAN) that allows that FC networking device to provide communications between the local server devices, local storage devices, remote server devices, and remote storage devices. The need to perform these manual configurations and/or configuration changes (i.e., when the SAN is set up, or if the FC networking device is moved between the different types of SANs discussed above) requires a reboot of the FC switch, which stops traffic to the its respective local devices during the reboot process. As discussed below, the method 400 provides for the automatic configuration of the FC networking device in a gateway/standalone mode that provides several benefits over conventional standalone and gateway modes such as, for example, providing for gateway mode error recovery that allows the local devices to continue to communicate even when the NPIV gateway link to the FC networking device fails, and providing for more efficient routing of local device traffic.

Figure 5:
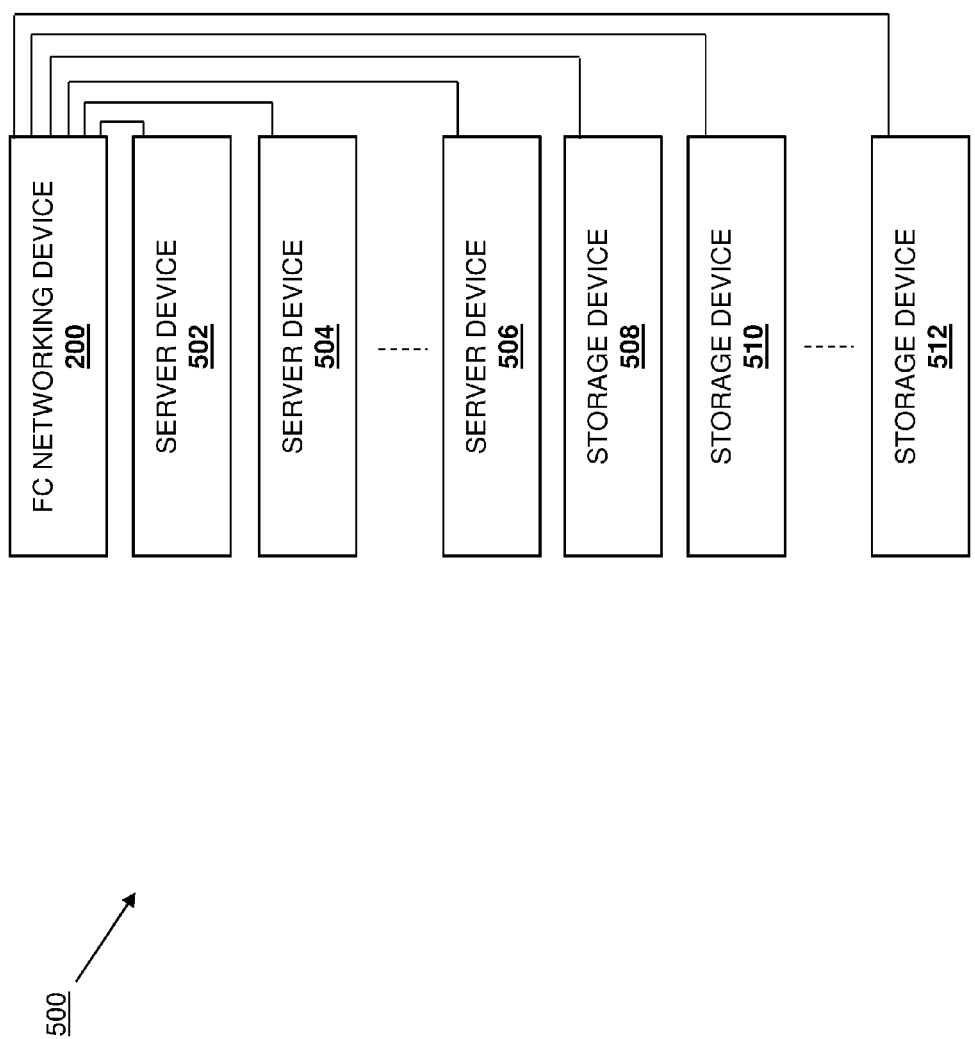
FIG. 5 is a schematic view illustrating an embodiment of a standalone FC networking device configuration.
Figure 6:
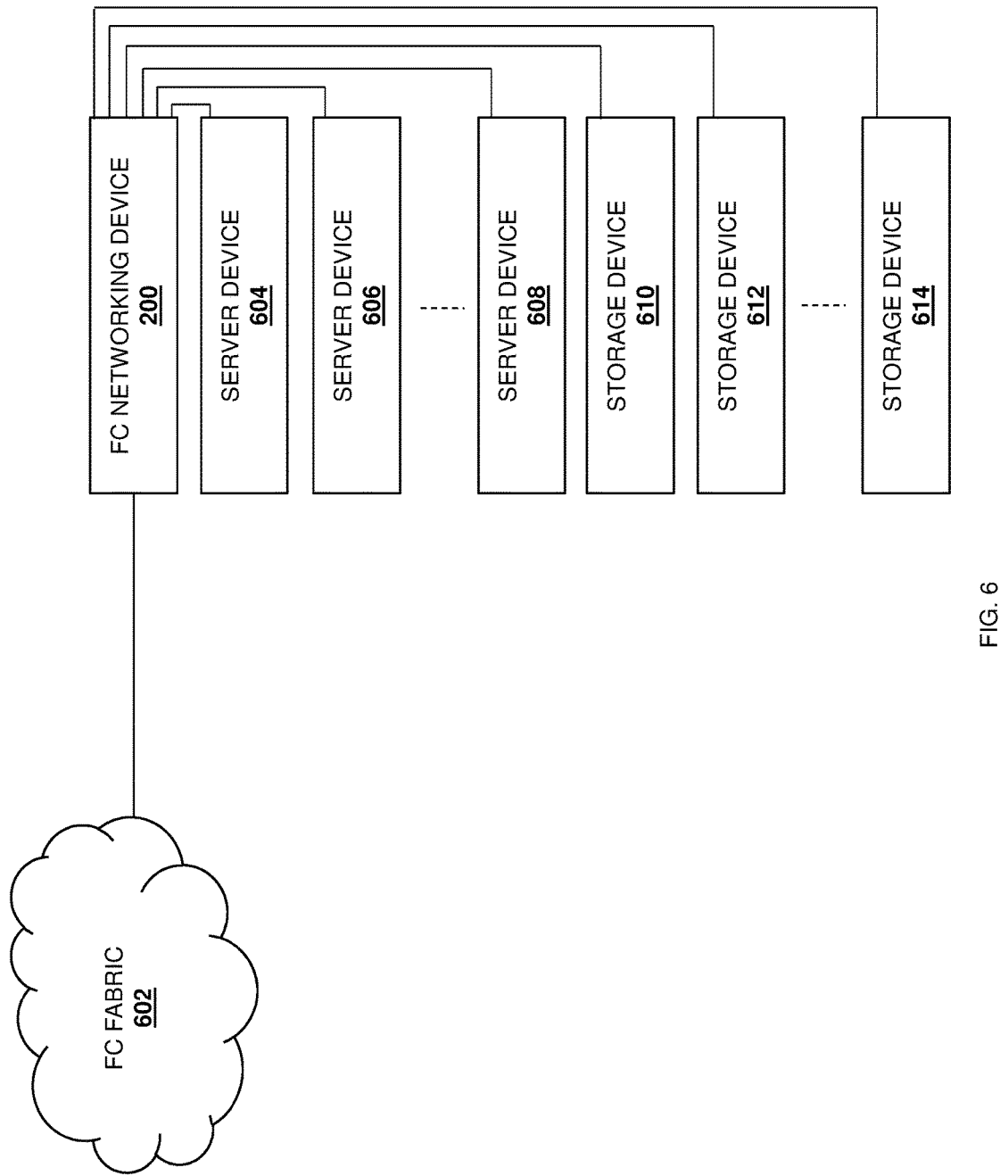
FIG. 6 is a schematic view illustrating an embodiment of a gateway FC networking device configuration

With reference to FIGS. 5 and 6, embodiments of a standalone FC networking device configuration and a gateway FC networking device configuration are illustrated for reference to the discussion of the method 400 below. FIG. 5 illustrates an embodiment of a standalone FC networking device configuration 500 that includes the FC networking device 200 coupled to a plurality of local devices that include a plurality of server devices 502, 504, and up to 506, and a plurality of storage devices 508, 510, and up to 512. In the examples below, each of the server devices 502-506 and the storage devices 508-512 are coupled to one or more of the first subset of ports 208a on the FC networking device 200 while none of the second subset of ports 208b on the FC networking device 200 is coupled to an FC fabric (e.g., a SAN). As discussed above, in the standalone FC networking device configuration 500, the FC networking device 200 may operate to provide communications between the server devices 502-506 and the storage devices 508-512.

FIG. 6 illustrates an embodiment of a gateway FC networking device configuration 600 that includes the FC networking device 200 coupled to an FC fabric 602 (e.g., a SAN) as well as plurality of local devices that include a plurality of server devices 604, 606, and up to 608, and a plurality of storage devices 610, 612, and up to 614. As discussed above, the FC fabric 602 may include other FC networking devices that are coupled to "remote" devices (i.e., remote to the FC networking device 200) that may include server devices and storage devices (not illustrated). In the examples below, the FC fabric is coupled to one or more of the second subset of ports 208b on the FC networking device 200, and each of the server devices 604-608 and the storage devices 610-614 are coupled to one or more of the first subset of ports 208a on the FC networking device 200. As discussed above, in the gateway FC networking device configuration 600, the FC networking device 200 may operate as a gateway to provide communications between the FC fabric 602 and the server devices 604-608 and the storage devices 610-614. For example, in the gateway FC networking device configuration 600, the FC networking device 200 may operate as an NPIV gateway that allows multiple FC N_Port IDs to share a single physical N_Port, which allows multiple FC initiators (e.g., the local devices) to occupy a single physical port to the FC fabric 602 to, for example, ease the hardware requirements associated with SAN design (particularly where virtual SANs are utilized to allow each virtual server to see its own storage and not the storage of other virtual servers). While specific examples of a standalone FC networking device configuration and a gateway FC networking device configuration have been described and are referenced below with respect to the method 400, one of skill in the art in possession of the present disclosure will recognize that a variety of different configurations will qualify as standalone or gateway and benefit from the teachings of the present disclosure while remaining within its scope.

The method 400 begins at block 402 where initialization operations are performed. In an embodiment, at block 402 the FC networking device 200 may be powered on, reset, rebooted, and/or otherwise initialized and, in response, the gateway/standalone mode engine 204 operates to perform FC networking device initialization operations for the FC networking device 200. For example, the gateway/standalone mode engine 204 may perform any of a variety of initialization operations known in the art to prepare the FC networking device 200 for operation such that the remainder of the method 400 may be performed. In some embodiments, the FC networking device 200 and/or gateway standalone mode engine 204 may be set in an "automatic detect" mode that allows the method 400 to be performed, while in other embodiments, the FC networking device 200 may be configured to perform the method 400 without being set in any particular mode.

In an embodiment, upon completion of the initialization operations, the gateway/standalone mode engine 204 may operate to "bring up" or otherwise activate each of the first subset 208a and the second subset 208b of ports on the FC networking device 200. For example, the gateway/standalone mode engine 204 may operate to cause each of the first subset 208a and the second subset 208b of ports on the FC networking device 200 to operate in an IDLE/IDLE state at the FC0/FC1 link layer such that each of the first subset 208a and the second subset 208b of ports on the FC networking device 200 are in an active state and associated with credit(s). As would be appreciated by one of skill in the art, in this state, a port connected to a local device (e.g., an FC end device such as an initiator device or a target device) is configured to receive a local device fabric login (FLOGI) from that local device. While a few specific examples have been provided, one of skill in the art in possession of the present disclosure will recognize that a variety of initialization operations and post-initialization operations may be performed at block 402 to allow the FC networking device 200 to communicate with attached devices, systems, and subsystems via its ports while remaining within the scope of the present disclosure.

The method 400 then proceeds to block 404 where local device fabric logins (FLOGIs) are received from local devices through a first subset of ports. In an embodiment, at block 404, the gateway/standalone mode engine 204 receives local device fabric FLOGIs from local device connected to its ports. For example, with reference to the standalone FC networking device configuration 500 of FIG. 5, the gateway/standalone mode engine 204 in the FC networking device 200 may receive local device FLOGIs from each of the server devices 502-506 and the storage devices 508-512 through the first subset 208a of ports on the FC networking device 200. However, one of skill in the art in possession of the present disclosure will recognize that, in some embodiments, one or more of the local devices (e.g., the server devices 502-506 and the storage devices 508-512) may not provide a FLOGI to its connected port(s) (e.g., due to a malfunction in the local device and/or other issues known in the art) while remaining within the scope of the present disclosure. In another example, with reference to the gateway FC networking device configuration 600 of FIG. 6, the gateway/standalone mode engine 204 in the FC networking device 200 may receive local device FLOGIs from each of the server devices 604-608 and the storage devices 610-614 through the first subset 208a of ports on the FC networking device 200. Similarly as discussed above, one of skill in the art in possession of the present disclosure will recognize that, in some embodiments, one or more of the local devices (e.g., the server devices 604-608 and the storage devices 610-614) may not provide a FLOGI to its connected port(s) (e.g., due to a malfunction in the local device and/or other issues known in the art) while remaining within the scope of the present disclosure.

The method 400 then proceeds to block 406 where local addresses are associated with local devices in a mapping database. In an embodiment, at block 406 the gateway/standalone mode engine 204 operates to identify each of the local devices that provided a local device FLOGI at block 404, and provide a local address in the mapping database 206/300 in association with each of those local devices. For example, with reference to the gateway FC networking device configuration 600 of FIG. 6 and the mapping database 300, the gateway/standalone mode engine 204 operates to identify each of the server devices 604-608 and storage devices 610-614 that provided a local device FLOGI at block 404 (e.g., using respective identifications of those server devices 604-608 included in those FLOGIs and/or other server device identification techniques), and provide respective local addresses 700, 702, 704, 706, 708, and 710 in the mapping database 300 in association with those server devices 604-608 and storage devices 610-614. For example, the local addresses 700-710 may be provided in a DDAAPP format, where DD provides a Domain identifier, AA provides an Area identifier, and PP provides an Arbitrated Loop Physical Address (ALPA), Port or an N_Port identifier virtualization (NPIV) device number. While not illustrated or described in detail, one of skill in the art in possession of the present disclosure will recognize that in the standalone FC networking device configuration 500 of FIG. 5, the gateway/standalone mode engine 204 in the FC networking device 200 may operate to identify each of the server devices 502-506 and storage devices 508-512 that provided a local device FLOGI at block 404, and provide respective local addresses in the mapping database 300 in association with those server devices 502-506 and storage devices 508-512 in a similar manner as discussed above.

The method 400 then proceeds to block 408 where FC networking device fabric login(s) (FLOGI(s)) are transmitted through a second subset of ports through which no local device FLOGIs were received. In an embodiment, at block 408 the gateway/standalone mode engine 204 operates to transmit an FC networking device (FLOG) through each of the second subset 208b of ports through which no local device FLOGI was received at block 404. In an embodiment, the FC networking device FLOGIs transmitted at block 408 may be considered "proxy" FC FLOGIs that are issued on a link to determine whether that link is connected to an FC fabric (e.g., an upstream SAN) or to a malfunctioning local device.

For example, after causing each of the first subset 208a and the second subset 208b of ports on the FC networking device 200 to operate in an IDLE/IDLE state at the FC0/FC1 link layer such that each of the ports on the FC networking device 200 are in an active state and associated with credit(s) at block 402, the gateway/standalone mode engine 204 may determine whether a local device FLOGI has not been received through any of those ports for a predetermined time period (e.g., a standard time-out value such as a Resource Allocation TimeOut Value (R_A_TOV)) and, if so, transmit an FC networking device FLOGI through those ports. As such, with reference to the standalone FC networking device configuration 500 of FIG. 5, the gateway/standalone mode engine 204 may determine that a local device FLOGI has not been received through any of the second subset 208b of ports on the FC networking device 200 for a predetermined time period and transmit an FC networking device FLOGI through each those second subset 208b of ports. Similarly, with reference to the gateway FC networking device configuration 600 of FIG. 6, the gateway/standalone mode engine 204 may determine that a local device FLOGI has not been received through any of the second subset 208b of ports on the FC networking device 200 for a predetermined time period and transmit an FC networking device FLOGI through each those second subset 208b of ports.

The method 400 then proceeds to decision block 410 where it is determined whether a fabric login acceptance (FLOGI ACC) has been received through any of the ports. In an embodiment, at block 410 the gateway/standalone mode engine 204 operates to determine whether a FLOGI ACC has been received through any of the ports through which the FC networking device FLOGI was sent at block 408. As would be understood by one of skill in the art in possession of the present disclosure, only FC fabric device such as the other FC networking device in the FC fabric 602 will respond to the FC networking device FLOGI sent at block 408, and thus a FLOGI ACC received by the gateway/standalone mode engine 204 through a port indicates that that port is connected to an FC fabric.

For example, with reference to the standalone FC networking device configuration 500 of FIG. 5, at block 410 the gateway/standalone mode engine 204 operates to determine whether a FLOGI ACC has been received through any of the second subset 208b of ports on the FC networking device 200 through which the FC networking device FLOGI was sent at block 408. Similarly, with reference to the gateway FC networking device configuration 600 of FIG. 6, at block 410 the gateway/standalone mode engine 204 operates to determine whether a FLOGI ACC has been received through any of the second subset 208b of ports on the FC networking device 200 through which the FC networking device FLOGI was sent at block 408.

If at decision block 410 it is determined that no FLOGI ACC has been received, the method 400 then proceeds to block 412 where communications are provided between the local devices using the local addresses. In an embodiment, at decision block 410 the gateway/standalone mode engine 204 operates to determine that no FLOGI ACC has been received, and then proceed to block 412 to provide communications between the local devices using the local addresses provided in the mapping database 206/300 at block 406. With reference to the standalone FC networking device configuration 500 of FIG. 5, the gateway/standalone mode engine 204 in the FC networking device 200 may operate to determine that no fabric login acceptance (FLOGI ACC) has been received through any of the second subset 208b of ports on the FC networking device 200 through which the FC networking device FLOGI was sent at block 408 and, in response, provide communications between any of the server devices 502-506 and/or the storage devices 508-510 using their associated local addresses in the mapping database 300. One of skill in the art in possession of the present disclosure will recognize that a determination that no FLOGI ACC has been received in response to the FC networking device FLOGIs sent at block 408 may be interpreted as no connection of the FC networking device 200 to an FC fabric (which would include an FC fabric device that would provide a FLOGI ACC in response to a FLOGI). A lack of connection to an FC fabric may be interpreted by the gateway/standalone mode engine 204 as the FC networking device 200 being in the standalone FC networking device configuration 500 and, as such, the gateway/standalone mode engine 204 may then operate to provide communications between its connected local devices (i.e., in the "standalone" portions of a hybrid gateway/standalone mode).

If at decision block 410 it is determined that a FLOGI ACC has been received, the method 400 then proceeds to block 414 where fabric discoveries (FDISCs) are transmitted for each local device through the second subset of the ports through which the FLOGI ACC was received. In an embodiment, at block 410 the gateway/standalone mode engine 204 operates to determine that a FLOGI ACC have been received, and then proceed to block 414 to transmit fabric discoveries (FDISCs) for each of the local devices that were identified using the local device FLOGIs received at block 404. With reference to the gateway FC networking device configuration 600 of FIG. 6, the gateway/standalone mode engine 204 in the FC networking device 200 may operate to determine that a FLOGI ACC has been received through any of the second subset 208b of ports on the FC networking device 200 through which the FC networking device FLOGI was sent at block 408 and, in response, transmit FDISCs for each of the local devices through those second subset 208b of ports to an FC fabric device (e.g., an FC networking device included in the FC fabric 602 such as an FC login server).

Figure 7A:
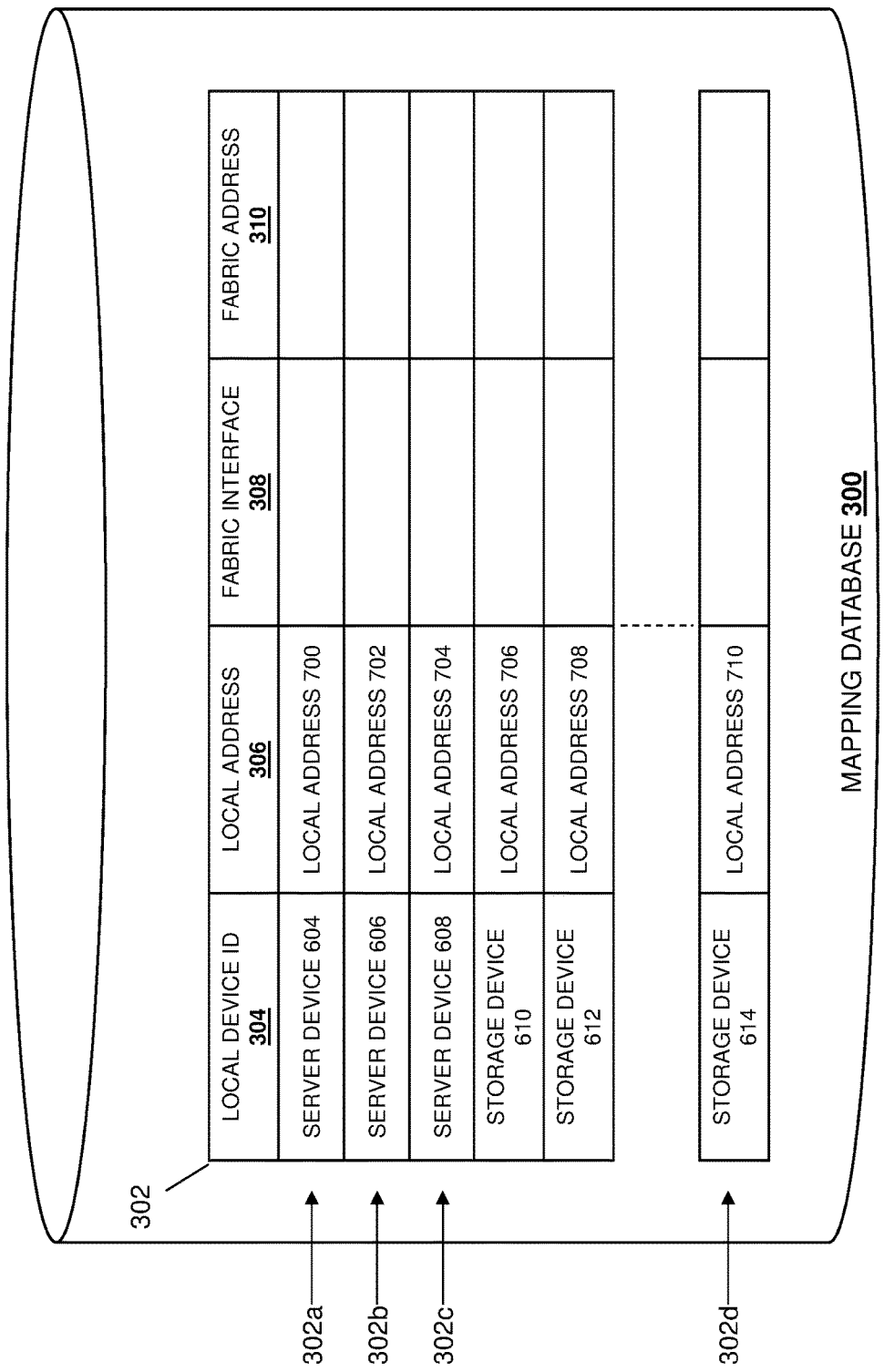
FIG. 7a is a schematic view illustrating an embodiment of information being provided in the mapping database of FIG. 3 during the method of FIG. 6.
Figure 7B:
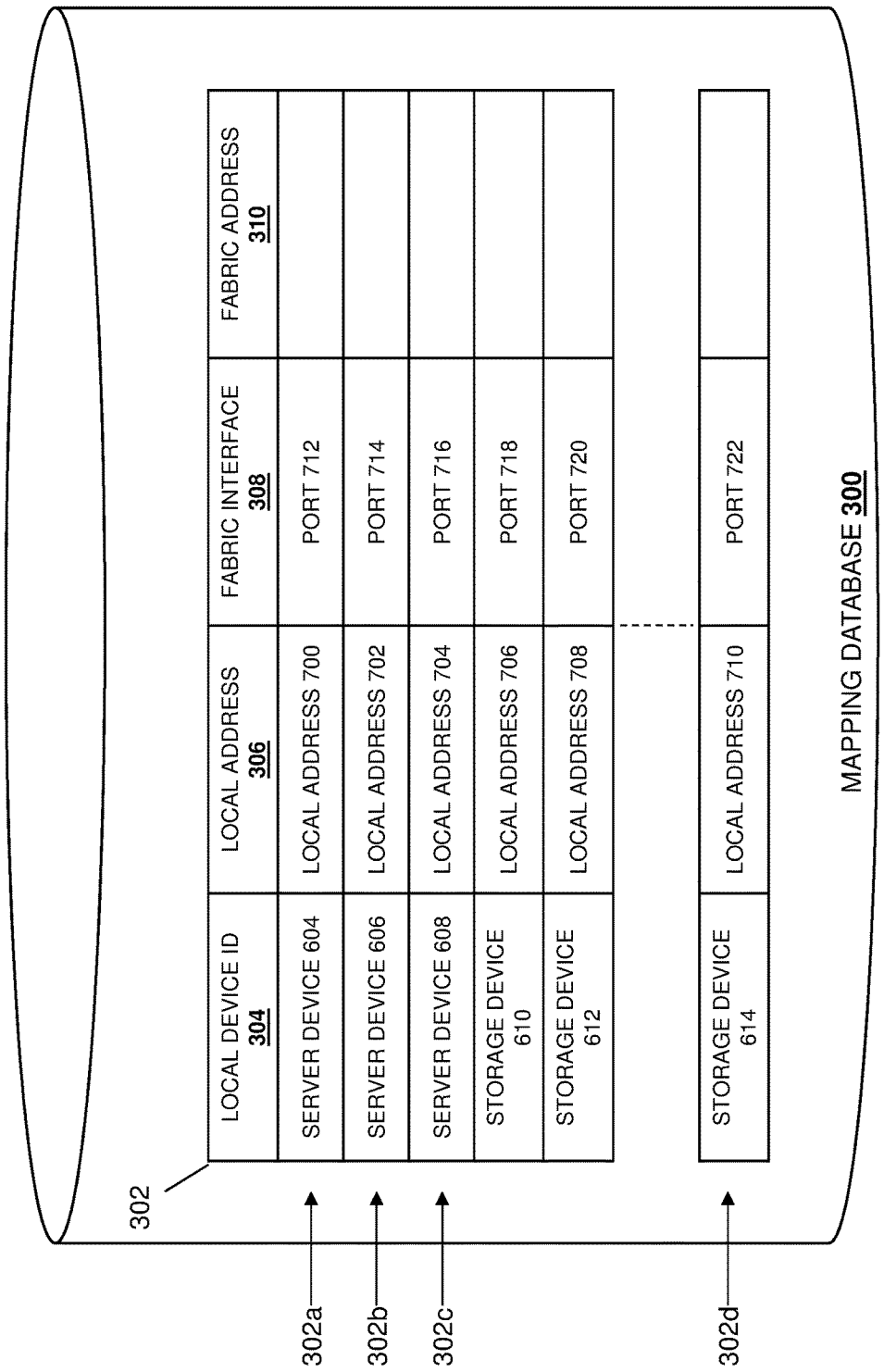
FIG. 7b is a schematic view illustrating an embodiment of information being provided in the mapping database of FIG. 3 during the method of FIG. 6.

One of skill in the art in possession of the present disclosure will recognize that a determination that a FLOGI ACC has been received in response to the FC networking device FLOGIs sent at block 408 may be interpreted by the gateway/standalone mode engine 204 as a connection of the FC networking device 200 to the FC fabric 602 (which includes an FC fabric device that provides the FLOGI ACC). A connection to the FC fabric 602 may be interpreted by the gateway/standalone mode engine 204 as the FC networking device 200 being in the gateway FC networking device configuration 600 and, as such, the gateway/standalone mode engine 204 may then operate to configure the mapping database 206/300 to provide communications between its connected local devices and the FC fabric 602 using the FDISCs. In response to receiving the FLOGI ACC, the gateway/standalone mode engine 204 may operate to assign a fabric interface to each of the local devices identified using the local device FLOGIs. For example, with reference to FIG. 7b, the gateway/standalone mode engine 204 may operate to assign the server devices 602-608 and storage devices 610-614 the respective ports 712, 714, 716, 718, 720, and 722 in the mapping database 300. One of skill in the art in possession of the present disclosure will recognize that the ports 712-722 may be respective ones of the first subset 208a of the ports on the FC networking device 200 that connect the server devices 602-608 and storage devices 610-614 to the FC networking device 200, and provide the fabric interface for the server devices 602-608 and storage devices 610-614 to the FC fabric 602.

The method 400 then proceeds to block 416 where fabric addresses are received in response to the FDISCs. In an embodiment, at block 416 the gateway/standalone mode engine 204 operates to receive respective fabric addresses for each of the local devices for which an FDISC was transmitted at block 414. As would be appreciated by one of skill in the art in possession of the present disclosure, in response to receiving each FDISC, the FC fabric device included in the FC fabric 602 assigns a fabric address to the local device for which that FDISC was transmitted, and transmits that fabric address to the FC networking device 200. As such, at block 416 the gateway/standalone mode engine 204 may receive fabric addresses through the second subset 208b of ports through which the FLOGI ACC was received and the FDISCs were transmitted.

Figure 7C:
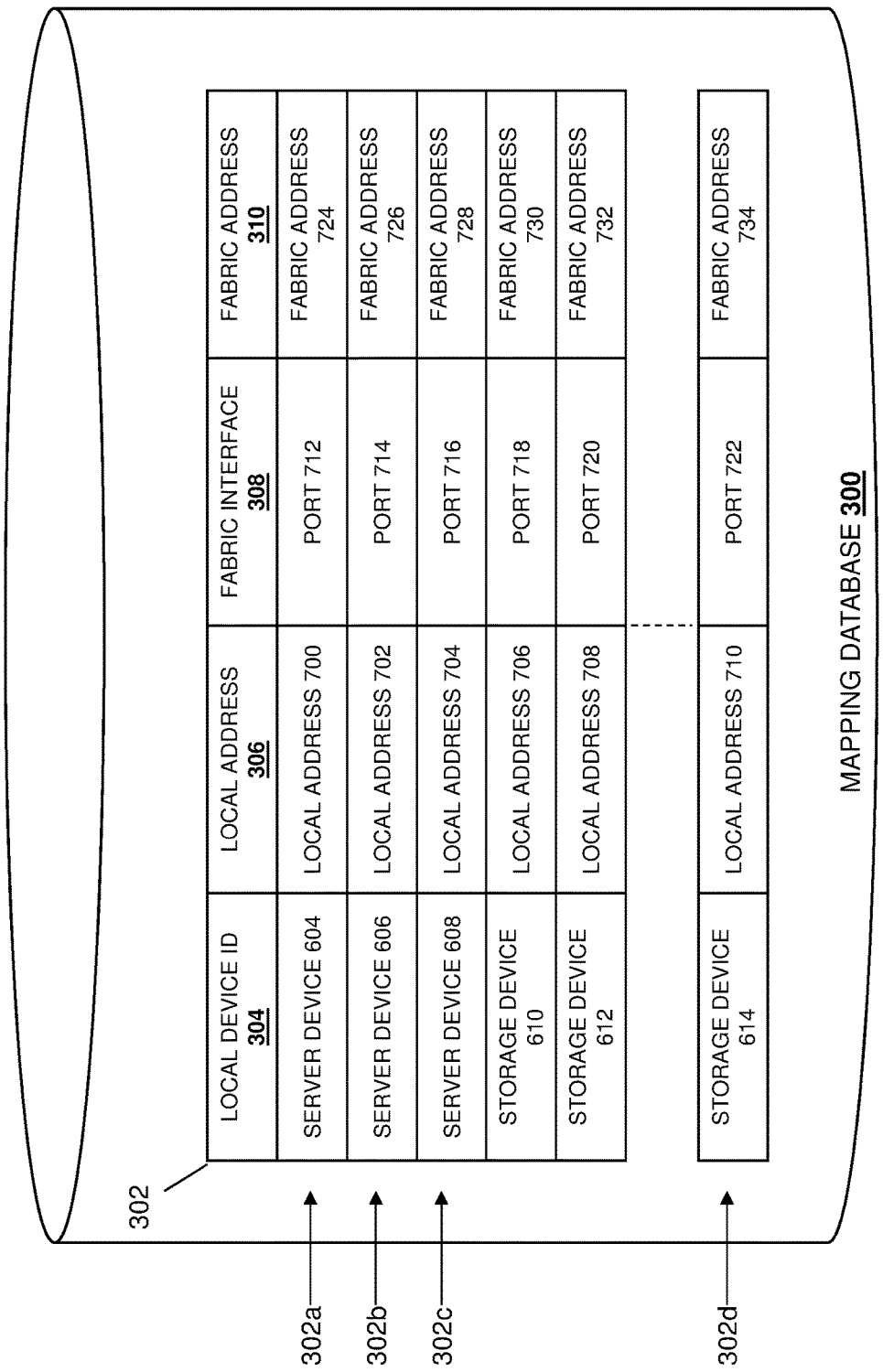
FIG. 7c is a schematic view illustrating an embodiment of information being provided in the mapping database of FIG. 3 during the method of FIG. 6.

The method 400 then proceeds to block 418 where fabric addresses are associated with local devices in the mapping database. In an embodiment, at block 418 the gateway/standalone mode engine 204 operates to associate fabric addresses with local devices in the mapping database 300. For example, with reference to the gateway FC networking device configuration 600 of FIG. 6 and the mapping database 300 illustrated in FIG. 7c, the gateway/standalone mode engine 204 operates to associate the server devices 604-608 and storage devices 610-614 with respective fabric addresses 724, 726, 728, 730, 732, and 734 in the mapping database 300. For example, the fabric addresses 724-734 may be similar to the local addresses 700-710 that were provided in the mapping database 300 as discussed above with reference to FIG. 7A (i.e., provided in a DDAAPP format, where DD provides a Domain identifier, AA provides an Area identifier, and PP provides an ALPA, Port or an NPIV device number.) However, one of skill in the art in possession of the present disclosure will recognize that the local addresses 700-710 are associated with the FC networking device 200 that the respective local devices are connected to, while the fabric addresses 724-734 are generated and associated with the upstream FC fabric 602 when the FC networking device 200 detects a connection to the FC fabric 602 (e.g., when the FC networking device 200 receives a FLOGI ACC at decision block 410.)

In a specific embodiment, a local address for a local device may be provided in the mapping database 300 as, for example, "010101" when the FC networking device 200 detect a connection to that local device (e.g., when the FC networking device 200 receives a local device FLOGI from that local device). If the FC networking device 200 detects a connection to the FC fabric 602 (e.g., when the FC networking device 200 receives a FLOGI ACC at decision block 410), the gateway/standalone mode engine 204 in the FC networking device 200 may determine that one of the second subset 208*b* of ports on the FC networking device 200 that is connected to the FC fabric 602 (e.g., an NPIV port) was assigned an FC ID of, for example, "021501". The gateway/standalone mode engine 204 in the FC networking device 200 may then operate to dynamically assign a corresponding fabric address for the local device (previously assigned the local address of "010101") of, for example, "021502". Subsequently, an FC address translation performed by the gateway/standalone mode engine 204 in the FC networking device 200 may function much as Network Address Translation (NAT) does in an Ethernet network, but only applied when traffic addressed to fabric address "021502" of the local device (with the local address "010101") is received through the one of the second subset 208*b* of ports on the FC networking device 200 (e.g., an NPIV gateway uplink.) Otherwise, the local address entries (e.g., "010101") in the mapping database 300 may be used to reach that local device. For embodiments using translated Media Access Control (MAC)-like versions of the local and fabric addresses, the FC networking device 200 may function similarly as described above, but with 3 prepended bytes (e.g., "000000010101" and "000000021502" using the examples above.) In an embodiment, in response to associating a fabric address with a local device in the mapping database 300, the gateway/standalone mode engine 204 may operate to send a Registered State Change Notification (RSCN) to that local device. For example, the gateway/standalone mode engine 204 may generate and provide FC/FCoE addresses for RSCN's about state changes to the local devices through the NPIV gateway port as an external address (e.g., "021502" in the example above), and may generate and provide local RSCNs for changes in state to local devices as the originally logged in local FC address (e.g., "010101" in the example above).

The method 400 then proceeds to block 420 where communications are provided between the local devices and an FC fabric using the local addresses and the fabric addresses. In an embodiment, at block 420 the gateway/standalone mode engine 204 operates to provide communications between the local devices and the FC fabric 602 using the local addresses and the fabric addresses provided in the mapping database 206/300. With reference to the gateway FC networking device configuration 600 of FIG. 6, the gateway/standalone mode engine 204 in the FC networking device 200 may operate to provide communications between any of the server devices 502-506 and/or the storage devices 508-510, and between the FC fabric 602 and any of the server devices 502-506 and the storage devices 508-510, using their associated local addresses and the fabric addresses in the mapping database 300. Thus, local communications between server devices 502-506 and the storage devices 508-510 may be provided by the gateway/standalone mode engine 204 using the local addresses for those server devices 502-506 and the storage devices 508-510 in the mapping database 300. One of skill in the art in possession of the present disclosure will appreciate that such local communications may be provided by the FC networking device 200 directly through the FC networking device 200 using the local addresses 700-710 and without the need to forward those communications to the FC fabric 602, which provides more efficient routing of communications relative to conventional FC switches that, when operating in NPIV gateway mode, must receive local communications for an local initiator device, forward such local communications to the FC fabric, and receive those local communications back for provisioning to the local target device.

Similarly, fabric/remote communications between the FC fabric 602 and the server devices 502-506 and storage devices 508-510 may be provided by the gateway/standalone mode engine 204 using the local addresses and fabric addresses for those server devices 502-506 and the storage devices 508-510 in the mapping database 300. One of skill in the art in possession of the present disclosure will appreciate that such fabric/remote communications may be provided by the gateway/standalone mode engine 204 receiving fabric/remote communications from a local initiator device (e.g., one of the server devices 604-608) that include the local address associated with that local initiator device, replacing that local address in the fabric/remote communications with the fabric address associated with that local initiator device, and forwarding the fabric/remote communications to the FC fabric 602 so that the FC fabric 602 may route those fabric/remote communications to the appropriate remote target device. Similarly, the FC fabric 602 may receive and route fabric/remote communications from a remote initiator device to the FC networking device 200, and the FC networking device 200 may receive those fabric/remote communications from the FC fabric 602, identify a fabric address in the fabric/remote communications that is associated with a local target device (e.g., one of the storage devices 610-614), replace that fabric address with the local address associated with that local target device, and forward the fabric communication to that local target device. One of skill in the art in possession of the present disclosure will appreciate that in the even the link to the FC fabric 602 (e.g., an NPIV link) fails such that the FC fabric 602 is no longer accessible by the FC networking device 200, the local communication functionality of the gateway/standalone mode engine 204 will still be available to route local communications between the server devices 604-608 and the storage devices 610-614, thus providing a level of error recovery in the FC networking device 200.

Thus, systems and methods have been described that provide an FC networking device that includes a "hybrid" gateway/standalone mode that alleviates the need for manual configuration of the FC networking device to operate in either a standalone mode or an NPIV gateway mode. As such, whether the FC networking device is included in a SAN to provide communications between local devices (while not being connected to or providing communications with an FC fabric that includes other FC switches), or included in a SAN to provide communications between local devices and/or between those local devices and an FC fabric that includes other FC networking device coupled to their respective remote devices, the FC networking device may be automatically configured to operate in a hybrid gateway/standalone mode that provides fabric and/or local communications that result in several benefits over conventional manually configured systems such as, for example, providing for NPIV gateway link error recovery that allows the local devices to continue to communicate even when the NPIV gateway link to the FC networking device fails, and providing for a more efficient routing of local device traffic.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A gateway/standalone Fibre Channel (FC) system, comprising:
a plurality of local devices; and
an FC networking device that includes a plurality of ports that couple the plurality of local devices to the FC networking device, wherein the FC networking device is configured to:
receive a local device fabric login through each of a first subset of the plurality of ports, wherein each local device fabric login identifies one of the plurality of local devices;
provide a local address in a mapping database for each of the plurality of local devices identified by the local device fabric logins;
transmit an FC networking device fabric login through each of a second subset of the plurality of ports through which no local device fabric login was received;
determine whether a fabric login acceptance has been received through any of the second subset of the plurality of ports through which the FC networking device fabric login was transmitted;
provide, in response to determining that the fabric login acceptance was received, a fabric address in the mapping database for each of the plurality of local devices identified by the local device fabric logins, and use the local address and the fabric address for each of the plurality of local devices identified by the local device fabric logins to provide communications between the plurality of local devices identified by local device fabric logins and an FC fabric; and
use, in response to determining that no fabric login acceptance was received, the local address for each of the plurality of local devices identified by the local device fabric logins to provide communications between the plurality of local devices identified by the local device fabric logins.

2. The gateway/standalone FC system of claim 1, wherein the FC networking device is configured to:
perform FC networking device initialization operations; and
configure, in response to performing the FC networking device initialization operations, each of the plurality of ports to receive a local device fabric login.

3. The gateway/standalone FC system of claim 1, wherein the FC networking device is configured to:
determine that a local device fabric login has not been received at each of the second subset of the plurality of ports for a predetermined time period and, in response, transmit the FC networking device fabric login through each of the second subset of the plurality of ports.

4. The gateway/standalone FC system of claim 1, wherein the FC networking device is configured to:
transmit, in response to determining that the fabric login acceptance was received, a fabric discovery for each of the plurality of local devices identified by the local device fabric log ins; and
receive, in response to each fabric discovery that was transmitted, the fabric address in the mapping database for each of the plurality of local devices identified by the local device fabric logins.

5. The gateway/standalone FC system of claim 1, wherein the FC networking device is configured to:
send, in response to providing the fabric address in the mapping database for any of the plurality of local devices identified by the local device fabric logins, a registered state change notification to that local device.

6. The gateway/standalone FC system of claim 1, wherein the plurality of local devices includes at least one server device and at least one storage device.

7. An information handling system, comprising:
a plurality of ports;
a processing system that is coupled to the storage device and the plurality of ports; and
a memory system that is coupled to the processing system and that includes instructions that, when executed by the processing system cause the processing system to provide a gateway/standalone mode engine that is configured to:
receive a first Fibre Channel (FC) fabric login through each of a first subset of the plurality of ports, wherein each first FC fabric login identifies one of a plurality of local devices;
provide a local address in a mapping database for each of the plurality of local devices identified by the first FC fabric logins;
transmit a second FC fabric login through each of a second subset of the plurality of ports through which no first FC fabric login was received;
determine whether a FC fabric login acceptance has been received through any of the second subset of the plurality of ports through which the second FC fabric login was transmitted;
provide, in response to determining that the FC fabric login acceptance was received, a FC fabric address in the mapping database for each of the plurality of local devices identified by the first FC fabric logins, and use the local address and the FC fabric address for each of the plurality of local devices identified by the first FC fabric logins to provide communications between the plurality of local devices identified by first FC fabric logins and an FC fabric; and
use, in response to determining that no FC fabric login acceptance was received, the local address for each of the plurality of local devices identified by the first FC fabric logins to provide communications between the plurality of local devices identified by the first FC fabric logins.

8. The IHS of claim 7, wherein the gateway/standalone mode engine is configured to:
perform initialization operations; and
configure, in response to performing the initialization operations, each of the plurality of ports to receive a first FC fabric login.

9. The IHS of claim 7, wherein the gateway/standalone mode engine is configured to:
determine that a first FC fabric login has not been received at each of the second subset of the plurality of ports for a predetermined time period and, in response, transmit the second FC fabric login through each of the second subset of the plurality of ports.

10. The IHS of claim 7, wherein the gateway/standalone mode engine is configured to:

transmit, in response to determining that the FC fabric login acceptance was received, an FC fabric discovery for each of the plurality of local devices identified by the first FC fabric logins; and receive, in response to each FC fabric discovery that was transmitted, the FC fabric address in the mapping database for each of the plurality of local devices identified by the first FC fabric logins.

11. The IHS of claim 7, wherein the gateway/standalone mode engine is configured to:

send, in response to providing the FC fabric address in the mapping database for any of the plurality of local devices identified by the first FC fabric logins, a registered state change notification to that local device.

12. The IHS of claim 7, wherein the plurality of local devices includes at least one server device.

13. The IHS of claim 7, wherein the plurality of local devices includes at least one storage device.

14. A method for providing a gateway/standalone mode in a Fiber Channel (FC) networking device, comprising:

receiving, by an FC networking device through each of a first subset of a plurality of ports on the FC networking device, local device fabric logins that each identify one of a plurality of local devices;

providing, by the FC networking device in a mapping database, a local address for each of the plurality of local devices identified by the local device fabric logins;

transmitting, by the FC networking device through each of a second subset of a plurality of ports on the FC networking device through which no local device fabric login was received, an FC networking device fabric login;

determining, by the FC networking device, whether a fabric login acceptance has been received through any of the second subset of the plurality of ports through which the FC networking device fabric login was transmitted;

providing, by the FC networking device in the mapping database in response to determining that the fabric login acceptance was received, a fabric address for each of the plurality of local devices identified by the local device fabric logins, and using the local address and the fabric address for each of the plurality of local devices identified by the local device fabric logins to provide communications between the plurality of local devices identified by local device fabric logins and an FC fabric; and using, by the FC networking device in response to determining that no fabric login acceptance was received, the local address for each of the plurality of local devices identified by the local device fabric logins to provide communications between the plurality of local devices identified by the local device fabric logins.

15. The method of claim 14, further comprising:
performing, by the FC networking device, initialization operations; and
configuring, by the FC networking device in response to performing the initialization operations, each of the plurality of ports to receive a local device fabric login.

16. The method of claim 14, further comprising:
determining, by the FC networking device, that a local device fabric login has not been received at each of the second subset of the plurality of ports for a predetermined time period and, in response, transmit the FC networking device fabric login through each of the second subset of the plurality of ports.

17. The method of claim 14, further comprising:
transmitting, by the FC networking device in response to determining that the fabric login acceptance was received, a fabric discovery for each of the plurality of local devices identified by the local device fabric logins; and
receive, by the FC networking device in response to each fabric discovery that was transmitted, the fabric address in the mapping database for each of the plurality of local devices identified by the local device fabric logins.

18. The method of claim 14, further comprising:
sending, by the FC networking device in response to providing the fabric address in the mapping database for any of the plurality of local devices identified by the local device fabric logins, a registered state change notification to that local device.

19. The method of claim 14, wherein the plurality of local devices includes at least one server device.

20. The method of claim 14, wherein the plurality of local devices includes at least one storage device.

* * * * *